(12) United States Patent
Haslam et al.

(10) Patent No.: US 12,113,815 B1
(45) Date of Patent: Oct. 8, 2024

(54) SYSTEMS AND METHODS OF USING NETWORK TRAFFIC DATA TO CONTROL DATA TRANSMISSION

(71) Applicant: United Services Automobile Association (USAA), San Antonio, TX (US)

(72) Inventors: Justin Dax Haslam, San Antonio, TX (US); Jose L. Romero, Jr., San Antonio, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 47 days.

(21) Appl. No.: 17/546,865

(22) Filed: Dec. 9, 2021

Related U.S. Application Data

(60) Provisional application No. 63/125,735, filed on Dec. 15, 2020.

(51) Int. Cl.
| | |
|---|---|
| *H04L 9/40* | (2022.01) |
| *H04L 45/00* | (2022.01) |
| *H04L 45/12* | (2022.01) |
| *H04W 4/02* | (2018.01) |

(52) U.S. Cl.
CPC ........ *H04L 63/1425* (2013.01); *H04L 45/123* (2013.01); *H04L 45/20* (2013.01); *H04L 45/22* (2013.01); *H04L 63/107* (2013.01); *H04W 4/025* (2013.01)

(58) Field of Classification Search
CPC ... H04L 63/1425; H04L 45/123; H04L 45/20; H04L 45/22; H04L 63/107; H04L 45/247; H04W 4/025
See application file for complete search history.

(56) References Cited

U.S. PATENT DOCUMENTS

| | | | | |
|---|---|---|---|---|
| 9,098,584 | B1 * | 8/2015 | Fredinburg | G06F 16/951 |
| 9,967,232 | B1 * | 5/2018 | Royt | H04L 61/00 |
| 10,091,281 | B1 * | 10/2018 | Lockhart | H04L 67/1023 |
| 10,944,818 | B1 * | 3/2021 | Izenberg | H04L 43/067 |
| 11,151,243 | B1 * | 10/2021 | McNamara, Jr. | H04L 63/0846 |
| 11,431,709 | B2 * | 8/2022 | Nickolai | H04L 41/16 |
| 11,637,766 | B2 * | 4/2023 | Devarajan | H04L 43/10 |
| | | | | 709/224 |
| 2009/0013399 | A1 * | 1/2009 | Cottrell | H04L 63/0421 |
| | | | | 726/12 |
| 2014/0026160 | A1 * | 1/2014 | Shrum, Jr. | H04N 21/2541 |
| | | | | 725/93 |

(Continued)

*Primary Examiner* — Gary S Gracia
(74) *Attorney, Agent, or Firm* — Fletcher Yoder, P.C.

(57) ABSTRACT

A method may include receiving, via a processor, a first set of data packets from a first computing device associated with a user over a first period of time. The method may then involve generating a network hop model indicative of one or more network hops traversed by the first set of data packets. The method may also include receiving a second set of data packets from the first computing device over a second period of time, determining whether the second set of data packets corresponds to the network hop model, and adjusting one or more operations associated with transmitting a third set of data packets to the first computing device in response to determining that the second set of data packets does not match the network hop model.

18 Claims, 4 Drawing Sheets

(56) References Cited

U.S. PATENT DOCUMENTS

| | | | |
|---|---|---|---|
| 2014/0164207 A1* | 6/2014 | Rotella | G06Q 40/04 705/37 |
| 2014/0359074 A1* | 12/2014 | Igelka | G06F 16/172 709/219 |
| 2015/0052606 A1* | 2/2015 | Romero Bueno | H04L 63/1425 726/23 |
| 2015/0058195 A1* | 2/2015 | Comly | G06Q 40/04 705/37 |
| 2015/0249651 A1* | 9/2015 | Okamoto | H04L 63/10 713/171 |
| 2015/0347591 A1* | 12/2015 | Bax | G06Q 50/01 707/749 |
| 2015/0350199 A1* | 12/2015 | You | G06Q 20/343 726/9 |
| 2016/0020969 A1* | 1/2016 | Vasseur | H04L 43/062 370/252 |
| 2016/0352768 A1* | 12/2016 | Lefebvre | H04W 12/08 |
| 2017/0222976 A1* | 8/2017 | Gross | H04L 63/1425 |
| 2018/0103085 A1* | 4/2018 | Fang | H04L 63/102 |
| 2018/0285767 A1* | 10/2018 | Chew | G06N 20/00 |
| 2018/0288060 A1* | 10/2018 | Jackson | H04L 63/107 |
| 2018/0295140 A1* | 10/2018 | Lu | G06F 16/951 |
| 2018/0343238 A1* | 11/2018 | Tola | H04L 63/0421 |
| 2018/0375841 A1* | 12/2018 | Tola | H04L 63/0464 |
| 2019/0044945 A1* | 2/2019 | Kundu | H04L 63/1408 |
| 2020/0053680 A1* | 2/2020 | Abedini | H04W 72/044 |
| 2020/0228529 A1* | 7/2020 | Douglas | H04L 63/107 |
| 2021/0065170 A1* | 3/2021 | Shriver | G06Q 20/02 |
| 2021/0065171 A1* | 3/2021 | Pliasunov | G06Q 20/3829 |
| 2021/0065185 A1* | 3/2021 | Krishnanand | G06Q 20/2295 |
| 2021/0065291 A1* | 3/2021 | Gaivironsky | G06Q 20/3674 |
| 2021/0099464 A1* | 4/2021 | Seaborn | H04L 63/126 |
| 2021/0256486 A1* | 8/2021 | Garrett | G06Q 20/401 |
| 2021/0377232 A1* | 12/2021 | Jain | H04L 63/164 |
| 2021/0392500 A1* | 12/2021 | Pollington | H04L 63/0218 |
| 2021/0406386 A1* | 12/2021 | Ortiz | G06N 20/00 |
| 2022/0159064 A1* | 5/2022 | Barton | H04L 45/126 |
| 2022/0238115 A1* | 7/2022 | Thiagarajah | G10L 17/04 |
| 2023/0156012 A1* | 5/2023 | Chowdhury | H04L 63/102 709/226 |
| 2023/0419304 A1* | 12/2023 | Cella | G06N 3/0475 |

* cited by examiner ions may face new challenges... (skipping)

SYSTEMS AND METHODS OF USING NETWORK TRAFFIC DATA TO CONTROL DATA TRANSMISSION

CROSS-REFERENCE TO RELATED APPLICATION

The present application claims benefit of and priority to U.S. Provisional Patent Application Ser. No. 63/125,735, titled "Systems and Methods of Using Network Traffic Data to Control Data Transmission," which was filed on Dec. 15, 2020, and which is herein incorporated by reference in its entirety for all purposes.

BACKGROUND

The present disclosure relates generally to using network traffic data to control data transmission. More specifically, the present disclosure relates to monitoring and analyzing network traffic data to facilitate preventing or resolving network data security concerns.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

As remote online services become more prevalent, organizations may face new challenges to provide improved network security against various network threats and risks (e.g., hacking attempts, data breaches, malware, phishing, denial of service attack, attacks on IoT devices) for their clients. With increasing connectivity, usage of cloud services, and outsourcing services, the network threats and risks become more sophisticated, thus harder to be detected, prevented, or controlled by the organizations. The constantly growing network security threats and risks may drive the organizations to utilize new technologies to accommodate these threats and risks more efficiently and promptly.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving, via a processor, a first set of data packets from a first computing device associated with a user over a first period of time. The method may then involve generating a network hop model indicative of one or more network hops traversed by the first set of data packets. The method may also include receiving a second set of data packets from the first computing device over a second period of time, determining whether the second set of data packets corresponds to the network hop model, and adjusting one or more operations associated with transmitting a third set of data packets to the first computing device in response to determining that the second set of data packets does not match the network hop model.

In another embodiment, a computer-readable medium that includes computer-executable instructions may cause a processor to receive a first set of data packets from a first computing device associated with a user over a first period of time and generate a network hop model indicative of one or more network hops traversed by the first set of data packets. The processor may then a second set of data packets from the first computing device over a second period of time, determine whether the second set of data packets corresponds to the network hop model, and adjust one or more operations associated with transmitting a third set of data packets to the first computing device in response to determining that the second set of data packets does not match the network hop model.

In yet another embodiment, a system may include a first computing device, a second computing device, and a server system. The server system may receive a first set of data packets from the first computing device associated with a user over a first period of time and generate a network hop model indicative of one or more network hops traversed by the first set of data packets. The server system may then receive a second set of data packets from the first computing device over a second period of time, determine whether the second set of data packets corresponds to the network hop model, and adjust one or more operations associated with transmitting a third set of data packets to the first computing device in response to determining that the second set of data packets does not match the network hop model.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
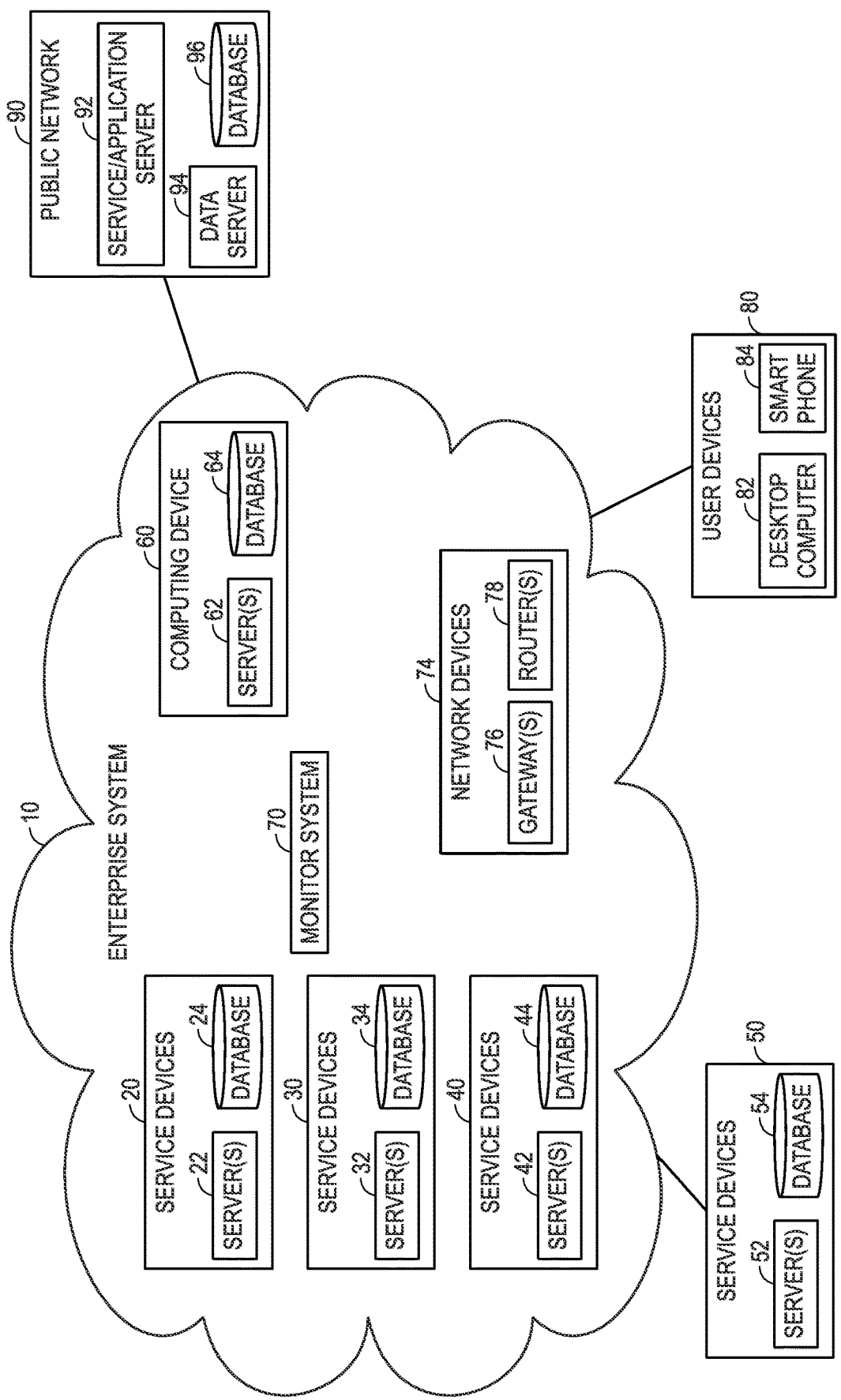
FIG. 1 illustrates a block diagram of a system for monitoring and analyzing network traffic data between a user device and various sources using a monitoring system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As remote online services become more prevalent, organizations may face new challenges to provide improved network security against various network threats and risks for their clients and other users who may use services and/or products provided by the organizations via their enterprise networks. The network threats may include cybersecurity threats such as hacking attempts, data breaches, malware, phishing, denial of service attack, attacks on IoT devices, man-in-the-middle attack, Domain Name System (DNS) tunneling, and SQL injection. As the technologies evolve, the cybersecurity threats become more sophisticated, thus harder to be detected, prevented, or controlled by IT security teams of the organizations. With increasing global connectivity, usage of cloud services, and outsourcing services, the network risks (e.g., third-party risks, vendor risks) may encompass a larger attack vector than in the past. The constantly growing network security threats and risks may drive the organizations to utilize new technologies to accommodate these threats and risks more efficiently and promptly.

Embodiments of the present disclosure are generally directed towards using network traffic data to control data transmissions associated with the remote online services provided by the organization to the users via enterprise networks and public networks (e.g., the internet). In some embodiments, the network traffic data from user devices (e.g., desktop computers, laptops, smart phones, tablets) may be traceable as transmitted data packets hop between different hubs. Such route-traceable network traffic data may be used to determine locations of the user devices. Additionally or alternatively, the network traffic data may be used to determine whether the user devices are being intercepted or becoming accessible to unwanted entities. For example, the network traffic data associated with a user device may include records of accessing the same website at different times. The records may include a number of hops, a time lapse between adjacent hops, IP addresses accessed at each hop, and so on. The records may be used to determine the location of the user or user device, the secure nature of the data transmissions between the user devices and other devices (e.g., servers of the enterprise networks and public networks), and the like.

With the foregoing in mind, in an embodiment, a monitoring system may be used to monitor and analyze network traffic data using computational models based on user behavior analysis. The network traffic data may include data packets transmitted from a user device (e.g., desktop computer, laptop, smart phone, smart watch, or tablet) that may be traceable as the data packets hop between different hubs. The network traffic data may be used to determine a location of the user device. In addition, the network traffic data may be used to determine whether the user device is being intercepted, becoming accessible to unwanted entities (e.g., hackers), or at risk for data interception or fraud.

The network system may use machine learning algorithms to determine expected network traffic data for different users based on the computational models (e.g., network hop model) representative of normal behavior patterns of the users. For example, a number of hops, IP addresses accessed in each hop, and other network traffic data may be used to cluster expected or safe network traffic and unexpected or unsafe network traffic. If the monitoring system detects that the expected or safe network traffic does not correspond to detected network traffic, the monitoring system may perform certain actions to authenticate the user. For example, the monitor system may send a push notification to a secondary device associated with the user to authenticate the user. The monitor system may query a location (e.g., GPS) of a secondary device (e.g., phone, watch) of the user to determine the location of the user.

In addition, the monitor system may adjust operations of the user device to control communications differently if the detected network traffic does not match the expected network traffic. In some embodiments, the monitoring system may cause network devices (e.g., gateway, router) to throttle the data transmission to reduce the amount of data transmitted while additional tracking operations may be implemented to identify potential hackers. In some embodiments, the monitor system may cause the user device to distinguish between data types and route sensitive data along a different route than non-sensitive data. In some embodiments, the monitor system may cause the user device or network devices (e.g., gateway) to break down data packets into sensitive/non-sensitive packets and send each packet via a different route. In some embodiments, different encryptions may be used for sensitive packets and non-sensitive packets. Additionally or alternatively, the non-sensitive data route may be monitored for competitor tracking (e.g., listening for competitor names) or patterns of used routes that may help identity fraudulent actors.

In some embodiments, if the monitoring system detects an unexpected or unsafe network, it may cause the user device to send pseudo data (e.g., random, dummy data) multiple times to track the route in which the data packets travel to assess the level of the risk of data accessibility or compromise by the unwanted entities. In addition, multiple transmissions of data may be used to establish a confidence value for the designation of unsafe network traffic. In some embodiments, certain computing devices that expect to receive data from the user device may employ IP tunneling technology to coordinate the reception of data packets. If potential fraud is detected, an additional tunnel may be generated for non-sensitive or dummy data to monitor the hackers of the additional tunnel. In some embodiments, intermediate network devices (e.g. gateway, router) may be used to incorporate layered encryptions that may transmit data packets via a random path through the networks, thereby making the transmit data packets hard to be intercepted. Additionally or alternatively, different path encryptions may be used. For example, the encryptions may be used at each node/link, such that multiple decryptions are performed when the data reaches its destination.

Additional details with regard to monitoring and analyzing network traffic data, using machine learning to detect unexpected or unsafe network traffic that may be related to network security threats or risks, employing IP tunneling to coordinate the receptions of the data packets, will be discussed in detail below with reference to FIGS. 2-4.

By way of introduction, FIG. 1 illustrates a block diagram of a system for monitoring and analyzing network traffic data between a user device and various sources using a monitoring system. The system may include an enterprise system 10, user devices 80, and a public network 90. The enterprise system 10, the user devices 80, and the public network 90 may communicate with each other using a variety of communication protocols. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The enterprise system 10 may be a cross-functional information system that provides organization-wide coordination and integration of the key business processes (e.g., services, productions) and helps in planning the resources of an organization (e.g., a bank, an insurance company, or a financial group). The enterprise system 10 may include an enterprise network operated by the organization. For example, the enterprise system 10 may include a private network, such as local area network (LAN) that includes a variety of computing and network devices including, but are not limited to, servers (e.g., processors), storage (e.g., memory), gateways, switches, and routers. The organization may use the enterprise system 10 to provide a variety of services for users (e.g., clients). In some embodiments, the enterprise system may actually be off premises (e.g., in a cloud or the like).

In an embodiment, the organization may be a bank that uses the enterprise system 10 to provide the users with online banking services, such as checking and saving accounts, debit and credit cards and other payment services, mortgage loans, and investment management, and the other personal banking related services. For example, the bank may include a banking department providing the users with personal checking and/or saving services. The personal checking and/or saving services may be hosted and managed on service devices 20, which may include one or more servers 22 and a database 24. The one or more servers 22 may provide support for running personal checking and/or saving related applications. User data, such as names, ages, addresses, phone numbers, social security numbers, account information, may be processed by the one or more servers 22 and stored in the database 24.

In one embodiment, the organization may also include payment services such as a debit and credit cards department providing the users with debit and credit cards services. The debit and credit cards services may be hosted and managed on service devices 30, which may include one or more servers 32 and a database 34. The one or more servers 32 may provide support for running debit and credit cards related applications. The user data, such as names, date of birth, addresses, and incomes, may be processed by the one or more servers 32 and stored in the database 34. In another embodiment, the organization may also include a mortgage loan department providing the users with mortgage loan services. The mortgage loan services may be hosted and managed on service devices 40, which may include one or more servers 42 and a database 44. The one or more servers 42 may provide support for running mortgage loan related applications. The user data, such as names, addresses, ages, marriage status, home values, bank information, employments, and salaries, may be processed by the one or more servers 42 and stored in the database 44.

In yet another embodiment, the organization may include one or more departments running services via service devices located outside the enterprise system 10 (e.g., in a cloud, such as a private cloud, a public cloud, or a hybrid cloud), which may be accessed by the users remotely via the enterprise system 10. For example, the organization may include an investment department providing the users with personal investment services. The personal investment services may be hosted and managed on service devices 50 located outside the enterprise system 10. The service devices 50 may include one or more servers 52 and a database 54. The one or more servers 52 may provide support for running investment management related applications. The user data (names, date of birth, emails, incomes, bank and/or credit card information, and tendencies) may be processed by the one or more servers 52 and stored in the database 54.

Additionally or alternatively, the organization may include a data service department providing data services (e.g., storage, backup, data analysis, computation, modeling, data mining, or machine learning) for service departments (such as the banking department, the debit and credit cards department, the mortgage loan department, and/or the investment department). The data services may be hosted, managed, and run on computing devices 60. The computing devices 60 may include one or more servers 62 and a database 64. The one or more servers 62 may provide support for running data management related applications. The user data (e.g., user identification, data of birth, first name, last name, social security, and age) may be processed by the one or more servers 62 and stored in the database 64. Although the service devices 20, 30, 40, and 50 and the computing devices 60 are described with respect to specific operations, it should be noted that the present embodiments described herein may be implemented in any suitable service device or department. That is, the presently disclosed embodiments should not be limited the examples provided in FIG. 1. Instead, the embodiments described herein may be applied to any data source that collects data related to individuals or other entities for a variety of services.

The services as described above may be provided to the users by the enterprise system 10 as service applications (e.g., web browser applications, mobile applications), which may be accessible to user devices 80 via network devices 74 between the user devices 80 and the enterprise system 10. The network devices 74 may include one or more gateways 76, one or more routers 78, and other suitable network devices (e.g., switches). The network devices 74 may be configured to control communications and interactions between various devices in or connected to the enterprise system 10. Data transmissions between the user devices 80 and the enterprise system 10 may include sensitive data associated with the user data mentioned above, such as names, ages, social security numbers, addresses, marriage status, home values, personal incomes, bank account information, debit and credit account information, mortgage loan information, and so on. To secure the data transmissions containing the sensitive data, the enterprise system 10 may provide network security to protect the data transmitted between the user devices 80 and the enterprise system 10 or the public network 90.

The network security may be designed to secure operations of the enterprise network, protect and oversee the data transmissions through the enterprise network, and prevent unauthorized personnel from gaining access to the computing and/or network devices in the enterprise system 10 or the user devices 80. The network security may include policies and practices adopted to prevent and monitor unauthorized access, misuse, modification, or denial of the enterprise network and network-accessible resources (e.g., servers, online services). The network security may also include authentications (e.g., authorizations of access to data in the enterprise system 10), which may be controlled by a network administration. The users may choose or may be assigned an identification (e.g., account number or username) and password or other authenticating information that allows them access to information and programs within their authority. In some embodiments, the network security may include controlled access, such as locks, biometric authentication and other suitable methods.

The enterprise system 10 may use certain computing and network devices to monitor and control the data transmissions through the enterprise system 10. The enterprise system 10 may include restrictions and access rules established to relegate access to selected users (e.g., clients, employees, third party service providers, regulatory representatives). In some embodiments, the network security may be implemented via a monitoring system 70. The monitoring system 70 may monitor and analyze network traffic data using computational models and models acquired via machine learning based on user behavior analysis. Based on network traffic monitoring and analysis, the monitoring system 70 may control the data transmissions through the enterprise system 10, including the data transmissions between the user devices 80 and the enterprise system 10, the data transmissions between the user devices 80 and the public network 90 via the enterprise system 10 (e.g., a client may use a service provided by the organization to acquire other services available in the public network 90). For example, the monitoring system 70 may adjust operations of the user devices 80 to control the data transmissions. In some embodiments, the monitoring system 70 may configure the network devices 74 to control the data transmissions. Additional details with regard to using the network traffic data to control the data transmissions, along with other technologies, such as employing Internet Protocol (IP) tunneling technology to coordinate receptions of data packets, will be discussed in detail below with reference to FIGS. 2-4.

The public network 90 may be a type of network accessible to general public (including the organization, the users, and other organizations and their clients/users) and connected to other private networks. The public network 90 may include service/application servers 92, data servers 94, databases 96, and other network devices, such as gateways, switches and routers. The public network 90 may directly provide, or may be used as platforms (e.g., by other organizations) to provide, a different variety of services (e.g., searching, shopping, social networking) for the users.

As illustrated, a user (e.g., client) may access one or more services provided by the organization using the user devices 80. The user devices 80 may include a variety of suitable devices, such as a desktop computer 82, a smartphone 84, a laptop, or a tablet. The user devices 80 may have access to the enterprise system 10 directly (e.g., through a specific virtual private network (VPN) connection) or indirectly (e.g., via the public network 90 and with certain security protocols). During an access to a service provided by the organization via the enterprise system 10, the user data (such as name, address, phone number, email address, age, and social security number) may be utilized (e.g., recorded, verified, processed, analyzed, modified, and modeled) by the organization using one or more service devices (e.g., service devices 20, 30, 40, and 50, computing devices 60, monitoring system 70).

Additionally or alternately, the user may access other services provided by the public network 90 using the user devices 80 via the enterprise system 10. For example, via the enterprise system 10 (e.g., using online banking services), the user may access some services directly provided by the public network 90 (e.g., online shopping, membership enrollments, or charity donations), or may access other services provided by other organizations that may use the public network 90 as service platforms (e.g., home insurance and auto insurance). During an access to a service provided by the public network 90 (directly or indirectly), the user data (such as name, address, phone number, email, age, social security number, bank and/or credit card information) may be utilized (e.g., recorded, verified, processed, analyzed, and modeled) by one or more service devices (e.g., service devices 20, 30, 40, and 50, computing devices 60, monitoring system 70, service/application servers 92, data servers 94).

Figure 2:
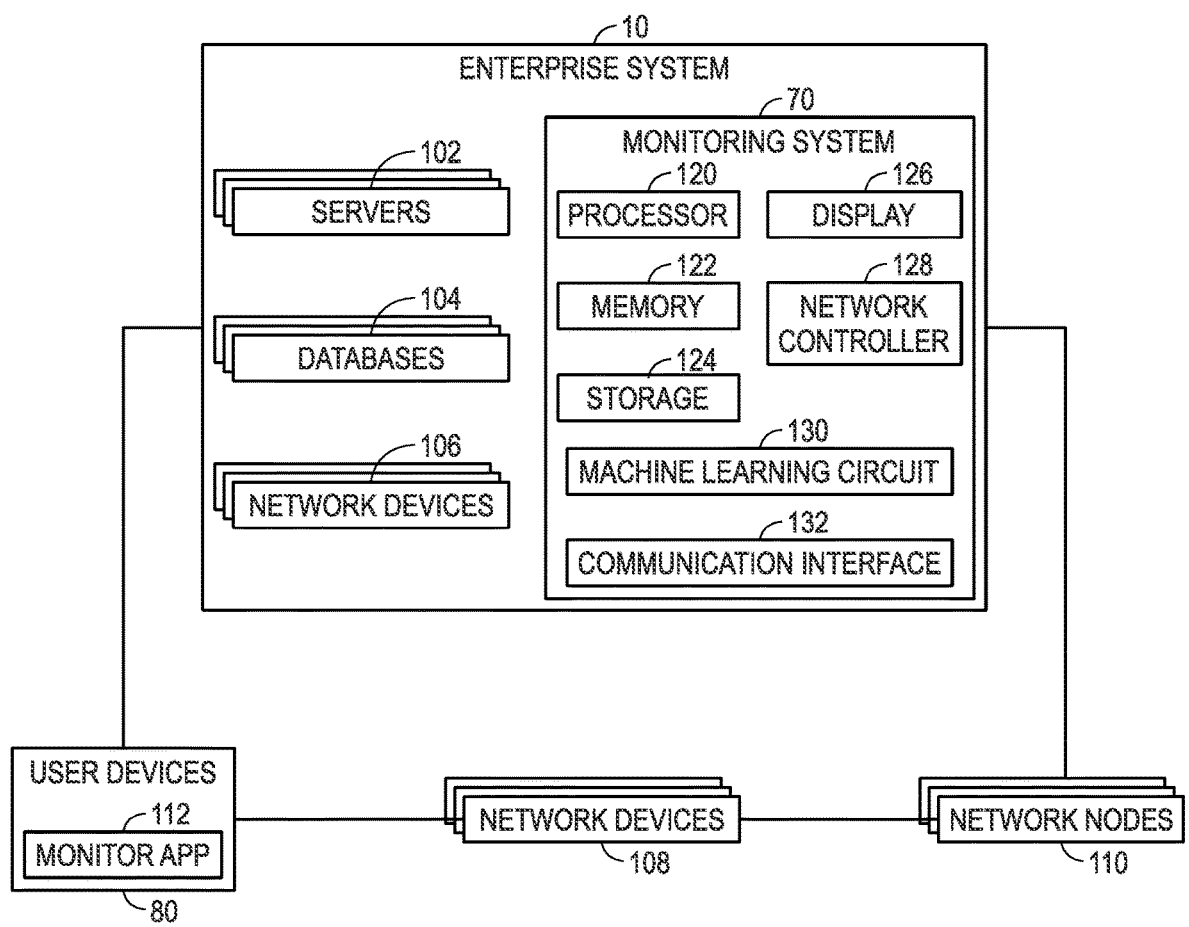
FIG. 2 illustrates a block diagram of implementations of the monitoring system of FIG. 1, in accordance with embodiments described herein.

Referring now to FIG. 2, a block diagram of implementations of the monitoring system 70 of FIG. 1. The monitoring system 70 may be implemented in the enterprise system 10 to monitor network traffic. Additionally or alternatively, a monitoring application 112 (e.g., software or app) may be installed in the user devices 80, such that, when the monitoring application 112 is launched or executed, the monitoring application 112 may monitor the network traffic associated with the user device 80. The monitoring application 112 may use same or similar methodology implemented in the monitoring system 70 to monitor the network traffic associated with the user. In some cases, the monitoring application 112 may be linked to the monitoring system 70 to use more advanced cloud computing resources (e.g., machine learning) that may be available in the enterprise system 10.

As described previously, the enterprise system 10 may include servers 102 (e.g., the one or more servers 22, 32, 42, 52, and 62, or the service/application servers 92), databases 104 (e.g., the databases 24, 34, 44, 54, 64, and 96), and network devices 106 (e.g., network devices 74). A user may use the user devices 80 to receive various services (e.g., personal checking or saving services, debit and credit cards services, mortgage load services, personal investment services, or other services including online shopping, membership enrollments, or charity donations) by accessing the servers 102 and databases 104 via the network devices 106. The user devices 80 may be configured to communicate with network nodes 110. The network nodes 110 may include one or more of the servers 102, one or more of the servers hosting the databases 104, one or more of the service/application servers 92, one or more of the data servers 94, and so on. The communications between the user devices 80 and the network nodes 110 may include the data transmissions based on various communication protocols.

For example, the data transmissions may be implemented by sending or receiving data packets 108 to or from network nodes 110. Each of the data packets 108 maybe a unit of data made into a single package that travels along a given route (e.g., network path). The data packets 108 may be used in Internet Protocol (IP) transmissions for data that navigates through different networks (e.g., the enterprise network, the public network 90). Each of the data packets 108 may include control information (e.g., header) and user data (e.g., payload). The control information may include data for delivering the payload. For example, the control information may include source and destination network addresses, error detection codes, or sequencing information. In some embodiments, the control information may include user identification information and encryptions to enhance the data security.

The monitoring system 70 may monitor network traffic data (e.g., data packets 108), perform data analysis using computational models and machine learning analysis based on monitored user behavior. The monitoring system 70 may include a processor 120, a memory 122, a storage 124, a display 126, a network controller 128, a machine learning circuit 130, a communication interface 132, and the like. The processor 120 may monitor network traffic data (e.g., data packets 108) via the communication interface 132. The communication interface 132 may be in communication with the network devices 106 and enable access to the network traffic data. Data analysis based on monitored network traffic data may be executed by the processor 120 using processor-executable code stored in the memory 122 and the storage 124. Based on the data analysis, data modeling and machine learning may be performed by the processor 120 using the machine learning circuit 130 and associated processor-executable code stored in the memory 122 and the storage 124. The data analysis, modeling, and machine learning may use data associated with the user and other users stored in the memory 122 and the storage 124. Analytic and modeling results may be stored in the memory 122 and the storage 124 for later usage. Based on the analytic and modeling results, the processor 120 may use the network controller and the communication interface 132 to adjust operations of the network devices 106 and/or the user devices 80 to control network communications related to the user. In some embodiments, the processors 120 may generate a notification to the user based on the analytic and modeling results. The communication interface 132 may provide the notification the user devices 80.

The processors 120 may process instructions for execution within the monitoring system 70. The processor 120 may be any type of computer processor or microprocessor capable of executing computer-executable code. The processors 120 may include single-threaded processor(s), multi-threaded processor(s), or both. The processors 120 may also include hardware-based processor(s) each including one or more cores. The processors 120 may include general purpose processor(s), special purpose processor(s), or both. The processors 120 may be communicatively coupled to other internal components (such as memory 122, storage 124, display 126, network controller 128, machine learning circuit 130, communication interface 132).

The memory 122 and the storage 124 may be any suitable articles of manufacture that can serve as media to store processor-executable code, data, or the like. These articles of manufacture may represent computer-readable media (e.g., any suitable form of memory or storage) that may store the processor-executable code used by the processor 120 to perform the presently disclosed techniques. The memory 122 and the storage 124 may also be used to store data described (e.g., user data), various other software applications for data analysis, modeling, machine learning, and the like. In some embodiments, the memory 122 and the storage 124 may include one or more databases to store additional data such as historical data associated with the user and other users. The additional data may be used for user behavior analysis to detect unexpected or unsafe network traffic. The memory 122 and the storage 124 may represent non-transitory computer-readable media (e.g., any suitable form of memory or storage) that may store the processor-executable code used by the processor 120 to perform various techniques described herein. It should be noted that non-transitory merely indicates that the media is tangible and not a signal.

The display 126 may operate to depict visualizations associated with software or executable code being processed by the processor 120. In an embodiment, the display 126 may be a touch display capable of receiving inputs from a user (e.g., an operator) of the monitoring system 70. The display 126 may be any suitable type of display, such as a liquid crystal display (LCD), plasma display, or an organic light emitting diode (OLED) display, for example. Additionally, in an embodiment, the display 126 may be provided in conjunction with a touch-sensitive mechanism (e.g., a touch screen) that may function as part of a control interface for the monitoring system 70.

The network controller 128 may be an intermediary between the servers 102 that provide various services as described and network infrastructures (e.g., the network devices 106). The network controller 128 may be used to manage and orchestrate various aspects of the enterprise network. The network controller 128 may include software applications that provide network functions to enable enhanced connectivity, security, collaboration, quality control, and the like. For example, the network controller 128 may be used to configure the network devices 106 to control the data transmissions over the enterprise network. In some embodiments, the network controller 128 may be used to adjust operations of the user devices 80 to control the data transmissions between the user devices 80 and the network nodes 110.

The user behavior analysis mentioned above may be performed by the machine learning circuit 130 using monitored network traffic data and additional data (e.g., historical user behavior data, other users' behavior data). The machine learning circuit 130 (e.g., circuit used to implement machine learning algorithms or logic) may access monitored network traffic data and additional data to identify patterns, correlations, or trends associated with behavior related to the user. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning circuit 130 may implement different forms of machine learning. In some embodiments, a supervised machine learning may be implemented. In supervised machine learning, the mathematical model of a set of user behavior data contains both the inputs and the desired outputs. The set of user behavior data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. two behaviors from different users) are. It has applications in fraud detection, ranking, recommendation systems, visual identity tracking, face verification, and speaker verification.

Additionally and/or alternatively, in some situations, it may be beneficial for the machine learning circuit 130 to utilize unsupervised learning (e.g., when particular output types are not known). Unsupervised learning algorithms take a set of user behavior data that contains only inputs, and find structure in the data, like grouping or clustering of user behavior data. The algorithms, therefore, learn from test data that has not been labeled, classified or categorized. Instead of responding to feedback, unsupervised learning algorithms identify commonalities in the user behavior data and react based on the presence or absence of such commonalities in each new piece of user behavior data.

Cluster analysis is the assignment of a set of observations (e.g., user behavior datasets) into subsets (called clusters) so that observations within the same cluster are similar according to one or more predesignated criteria, while observations drawn from different clusters are dissimilar. Different clustering techniques make different assumptions on the structure of the user behavior data, often defined by some similarity metric and evaluated, for example, by internal compactness, or the similarity between users of the same cluster, and separation, the difference between clusters. Predictions or correlations may be derived by the machine learning circuit 130. For example, groupings and/or other classifications of the user behavior data may be used to predict user behaviors. The predictions may be provided to downstream applications, which may perform actions based upon the predictions. The actions that are performed may be mediated through the secure service application controller 16, either directly or through a coupled secure system, that has access to the user identification associated with the anonymized user data, to facilitate secure communication with the user or other party that is authorized by the user.

The communication interface 132 may include the communication protocols described previously to facilitate communication between the monitoring system 70 and the other devices such as the servers 102, other servers hosting the databases 104, network devices 106, user devices 80, and so on. The communication interface 132 may be used to control communication channels for the data transmissions with enhanced connectivity, data security, and efficiency. In some embodiments, the communication interface 132 may include a high level of intelligence. For example, the communication interface 132 may enable or disable certain communication channels based on network traffic data analysis using the machine learning circuit 130. In some embodiments, the communication interface 132 may setup an Internet Protocol (IP) tunneling to coordinate transmission and receptions of the data packets 108 during the data transmissions.

Additionally, the monitoring system 70 may include other components to facilitate data communication. For example, the monitoring system 70 may include various I/O ports that may be used as interfaces to couple the monitoring system 70 to other peripheral components such as input devices (e.g., keyboard, mouse), sensors, input/output (I/O) modules, and the like. It should be noted that the components described above with regard to the monitoring system 70 are exemplary components and the monitoring system 70 may include additional or fewer components as shown.

Figure 3:
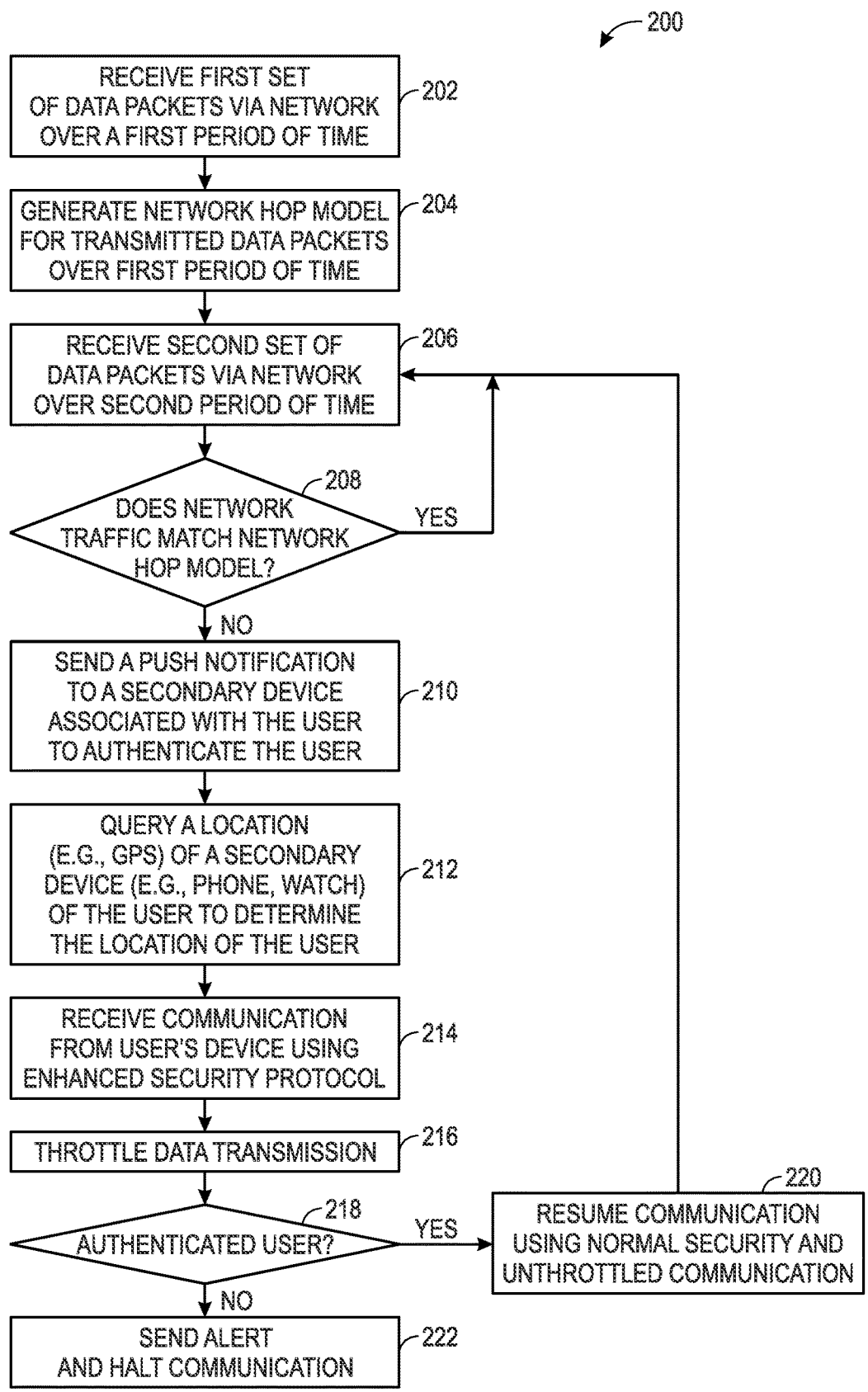
FIG. 3 illustrates a flow diagram of a process for monitoring network traffic data and controlling data transmission based on the implementations of the monitoring system of FIG. 2, in accordance with embodiments described herein.

With the foregoing in mind, FIG. 3 illustrates a flow diagram of a process 200 for monitoring network traffic data and controlling the data transmissions based on the implementations of the monitoring system 70 of FIG. 2. The monitoring system 70 may perform operations described below via the processor 120 based on processor-executable code stored in the memory 122 and the storage 124. The processor 120 may execute the processor-executable code to perform network traffic data monitoring and analysis. During the monitoring and analysis, the processor 120 may cause the other components to facilitate the process 200. For example, the processor 120 may cause the display 126 to display the monitoring and analytic results. The processor 120 may also cause the network controller 128 to adjust operations of the network devices 106 or the user devices 80 to control communications. The processor 120 may also cause the machine learning circuit 130 to perform machine learning to determine expected network traffic data for the user. Although the method described in FIG. 3 is described in a particular order and as being performed by a particular component, it should be understood that the method may be performed in any suitable order and by any suitable computing device or application.

At process block 202, the monitoring system 70 may receive a first set of data packets (e.g., a subset of data packets 108) via a network (e.g., the enterprise network) over a first period of time. For example, the first period of time may be a time period after a user enrolled in a remote online service such as the personal checking or saving service provided by the banking department via the service devices 20, the debit and credit cards services provided by the debit and credit cards department via the service devices 30, and the like. Over the first period of time, the user may use the newly enrolled remote online service with caution or direction (e.g., direction from the IT security teams of the organization). The user may limit his/her activities associated with the newly enrolled remote online service by accessing certain trusted (e.g., according to pervious user experience) or recommended (e.g., by the IT security teams of the organization) remote devices that may have low levels of network security threats or risks. For example, the user may access the service devices 40 to apply for the mortgage loan services provided by the mortgage loan department or the service devices 50 to apply for the personal investment services provided by the investment department using his/her personal checking or saving account, or the service/application servers 92 to initiate other services (e.g., online shopping, membership enrollments, or charity donations) provided by other trusted or recommended entities from the public network 90.

The first set of data packets may include information related to a number of hops between different hubs (e.g., network hubs in the enterprise network or the public network 90), time between hops, IP addresses accessed at each hop, and other relevant network traffic data related to the route in which the first set of data packets traversed. As such, in some embodiments, each network component that served as a network hub for the first set of data packets may encode or add information related to the respective network hub (e.g., an order, a time stamp, an IP address). The monitoring system 70 may receive the first set of data packets using the communication interface 132. Using the first set of data packets, the monitoring system 70 may perform data analysis. For example, the data analysis may include user behavior analysis based on the first set of data packets. Based on the data analysis, the monitoring system 70 may identify normal behaviors or activities of the user with respect to the hops in which the first set of data packets traversed. For example, the first set of packets may regularly hop between certain intermediate network hubs while on route to accessing the enterprise system 10. Such identified normal behaviors or activities may be developed by the monitoring system 70 into certain normal or expected network traffic behavior patterns that may be digitalized by using a computational model. The computational model may be used to detect any anomalous behavior or instances which deviate from the normal or expected network traffic behavior patterns.

With this in mind, the monitoring system 70 may generate a network hop model for transmitted data packets over the first period of time (process block 204). The monitoring system 70 may use the machine learning circuit 130 to perform a machine learning to generate the network hop model representative of normal behavior patterns of the user based on the first set of data packets and other collected data. The other collected data may include historical behavior data associated with the user when interacting with the organization for previous services. The other collected data may also include behavior data from other users who may potentially have certain behavior similarities determined based on, for example, similar age, gender, address, employment, personal income, and the like. The first set of data packets and other collected data may be stored in the databases 104 and accessible to the machine learning circuit 130.

At process block 206, the monitoring system 70 may receive a second set of data packets via the network (e.g., the enterprise network) over a second period of time. The second period of time may be a time period that corresponds to after the network hop model has been generated. For instance, the second time period may correspond to operations performed by the user after the user is more familiar with enrolled remote online services (e.g., personal checking or saving service, debit and credit cards services) and uses these services to perform more online activities (e.g., acquire more services from the organization via the enterprise system 10 or from other entities via the public network 90) more frequently. With increased online activities and greater exposure to unsecure or unsafe networks, the user devices 80 may become more vulnerable to network security threats and risks than the first period of time. For example, hackers may intercept some of the data packets transmitted from the user device, steal sensitive data (e.g., user device login information, identity information, social security number, bank account information, debit or credit card information), break into the user devices to copy, change, or destroy user's data, and use user's identity and other sensitive data to conduct malicious financial or social activities that may compromise user's daily life.

After receiving the second set of data packets, the monitoring system 70 may determine whether the network traffic data matches the network hop model (process block 208). For example, the network hop route may be extracted from the second set of data packets and compared to the normal behavior patterns represented by the network hop model. If the network traffic data matches the network hop model, the process 200 may return to the process block 206 to continuously receive new set of data packets and make new determination.

If the network traffic data does not match the network hop model, the monitoring system 70 may detect unusual behavior associated with the user or one of the user devices being used to transmit the received second set of data packets. For example, if the second set of data packets indicate that a first user device (e.g., a laptop) accessed the enterprise 10 via network hubs 1, 2, and 5, while the network hop model indicated an expected route of network hubs 1, 2, and 3, the monitoring system 70 may determine that unusual behavior or use may be present. After detecting unusual behavior associated with the user devices, the monitoring system 70 may send a push notification to a secondary device (e.g., smart phone or watch) associated with the user expected to be using the respective user device to authenticate the user (process block 210). The push notification may include an alert notifying the user that the first user device has been used for certain activities. The push notification may prompt the user to confirm that the user used the first user device for such activities.

At process block 212, the monitoring system 70 may query a location (e.g., GPS) of a secondary device associated with the user to determine the location of the user. The location of the secondary device (e.g., electronic watch, smart phone) may be compared to location information extracted from the first user device (e.g., based on an IP address used by the first user device when conducting the online activities during the second period of time). In this way, the monitoring system 70 may determine whether the user is indeed using the first user device based on whether the location of the secondary device corresponds to the location of the first user device.

While waiting for feedbacks from the user (e.g., confirmation of using the first user device, location of the secondary device), the monitoring system 70 may keep the communications from the first user device ongoing in order to determine whether the first user device is being intercepted, becoming accessible to unwanted entities (e.g., hackers), or at risk for data interception or fraud. The monitoring system 70 may receive communication from user's device using enhanced security protocol (process block 214). The enhanced security protocol may include a request for providing further identification information from the first user device, postponing online service requests (e.g., using user's personal checking account, debit or credit card), and the like. In some embodiments, intermediate network devices (e.g., gateway, router) may be used to incorporate layered encryptions that may transmit the data packets via a random path, making the transmitted data packets difficult to be followed or intercepted. Additionally or alternatively, different path encryptions may be used to each node (e.g., network node 110) or link (e.g., communication link for transmitting the data packets), or multiple decryptions may be performed when the data packets reaches a destination.

In some embodiments, the monitoring system 70 may throttle the data transmissions (process block 216). For example, the monitoring system 70 may use the network controller 128 to cause a gateway or router to reduce the amount of data transmitted from and/or to the user device (e.g. first user device), or slow down the data transmission rate while certain tracking operations may be implemented to identify potential network security threats of risks (e.g., hacking attempts, data breaches, malware, phishing, denial of service attack, attacks on IoT devices, man-in-the-middle attack). A true user and a potential hacker may have different behaviors in response to the throttled data transmissions. For example, the true user may contact the IT security team for experiencing the reduction of slowdown of the transmitted data. In contrast, the hacker may avoid contacting the IT security team and may make additional and unusual actions (e.g., multiple attempts for a service request with different credentials).

In some embodiments, the monitoring system 70 may adjust other operations of the user device to control communications differently if the network traffic data does not match an expected behavior. For example, the user device may distinguish between data types and route sensitive data along a different route than non-sensitive data. In some embodiments, the user device or certain network devices (e.g., gateway, router, or switch) may break down the data packets into sensitive/non-sensitive packets and send each packet via a different route. In some embodiments, encryptions used for sensitive packets and non-sensitive packets may be different. In addition, the non-sensitive data route may be monitored by the monitoring system 70 for competitor tracking (e.g., listening for competitor names) or patterns of used routes that may help identifying fraudulent actors.

In any case, based on the behavior analysis from user in response to the throttled data transmissions or adjusted operations or based on the push notification transmitted to the secondary device, the monitoring system 70 may determine whether the user is an authenticated user (process block 218). If the user currently accessing the user device is determined to be the authenticated user, the monitoring system 70 may resume communication from the user device using normal security and unthrottled communication (process block 220). The process 200 may return to the process block 206 to continuously receive new set of data packets and make new determination.

At process block 218, if the user currently accessing the user device is determined to be unauthenticated, the monitoring system 70 may send an alert and halt communication (process block 222) from the user's device. For example, the alert may be sent to a network administrator, the true user, or other appropriate party via an e-mail, a telephone call, a text message, or the like. The alert may include description of the detected anomalies and reasons with regard to the communications being halted.

As mentioned above, the monitoring system 70 may throttle the data transmissions (process block 216) while performing certain tracking operations to identify potential network security threats of risks. In some embodiments, the monitoring system 70 may also route data packets according to an Internet Protocol (IP) tunneling protocol in response to detecting that the user is unauthenticated. With this in mind, FIG. 4 illustrates a flow diagram of a process 300 for employing an Internet Protocol (IP) tunneling protocol to coordinate data transmission in response to detecting a potential fraud associated with the user device. Although the method described in FIG. 4 is described in a particular order and as being performed by a particular component, it should be understood that the method may be performed in any suitable order and by any suitable computing device or application.

Figure 4:
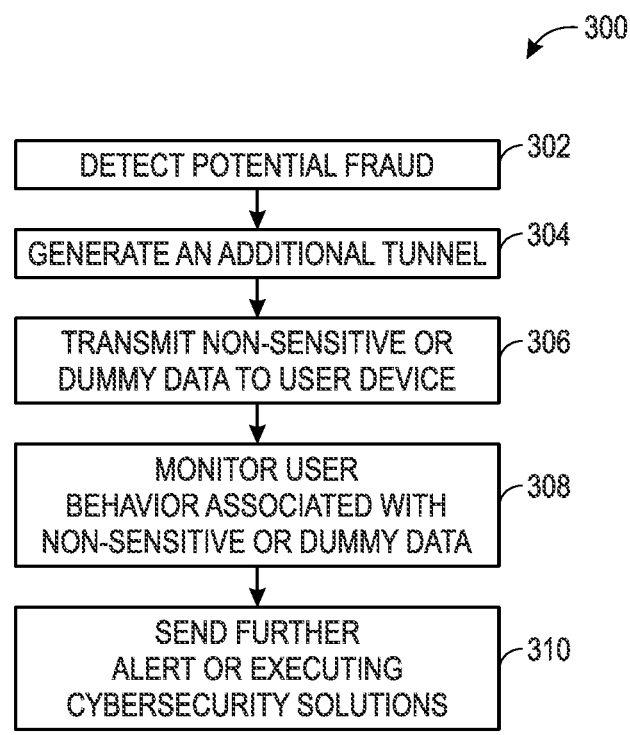
FIG. 4 illustrates a flow diagram of a process for employing an Internet Protocol (IP) tunneling to coordinate data transmission in response to detecting a potential fraud associated with the user device using the monitoring system of FIG. 1, in accordance with embodiments described herein.

Referring now to FIG. 4, the monitoring system 70 may detect potential fraud (process block 302) associated with a user device as described above. Such detection may be based on comparisons between user behavior extracted from the monitored user activities and the network hop model. For example, an unusually high amount of an online order may be a signal of a fraudulent activity.

In response to detecting the potentially fraudulent activity, the monitoring system 70 may generate an additional tunnel (process block 304) using Internet Protocol (IP) tunneling technology. An IP tunnel is IP network communication channel between two networks that don't have a native routing path to each other. The IP tunnel may be used to transport another network protocol by encapsulation of transmitted data packets. For example, the data packets to be transmitted via the additional IP tunnel may be modified by adding additional IP header and tunnel headers.

After the additional tunnel being generated, the monitoring system 70 may transmit non-sensitive or dummy data to the user device (process block 306) via the additional tunnel. For example, the non-sensitive or dummy data may include fake data (e.g., faked bank account, debit or credit card information). The faked data may be specific such that it appears to be real data to a fraudster.

The monitoring system 70 may monitor user behavior associated with non-sensitive, dummy, or pseudo data (process block 308). For example, after receiving the pseudo data (e.g., via an intercepted user device), the fraudster may use the pseudo bank account or debit/credit card information to withdraw money or place online orders. Such activities may be detected by the monitoring system 70, or other service servers (e.g., servers 22 or 32) and then reported to the monitoring system 70.

Based on monitoring the user behavior associated with non-sensitive or pseudo data, the monitoring system 70 may send further alert or executing cybersecurity solutions (process block 310). The cybersecurity solutions may include halting communication from intercepted user devices, installing new firewalls, adding additional layered encryptions, using improved communication protocols, and the like. The alert may be sent to the user via an e-mail, a telephone call, a text message, or the like. The alert may include descriptions of the detected fraudulent activities. In addition, the alert may include descriptions regarding the cybersecurity solutions being or to be executed to resolve currently detected fraud or prevent potential new frauds.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:
receiving, via a processor, a first set of data packets from a first computing device associated with a user over a first period of time;
generating, via the processor, a network hop model indicative of one or more network hops traversed by the first set of data packets;
receiving, via the processor, a second set of data packets from the first computing device over a second period of time;
determining, via the processor, whether the second set of data packets corresponds to the network hop model;
adjusting, via the processor, one or more operations associated with transmitting a third set of data packets to the first computing device in response to determining that the second set of data packets does not match the network hop model, wherein the one or more operations comprise:
generating an Internet Protocol (IP) tunnel configured to transmit the third set of data packets,
sending the third set of data packets to the first computing device via the IP tunnel;
generating a plurality of random pseudo bank data packets;

sending the plurality of random pseudo bank data packets via one or more additional IP tunnels; and sending, via the processor, a notification to a second computing device associated with the user to authenticate the user in response to determining that the second set of data packets does not match the network hop model.

2. The method of claim 1, comprising restoring the one or more operations associated with one or more data transmissions to the first computing device in response to authenticating the user.

3. The method of claim 1, wherein the second computing device is different from the first computing device.

4. The method of claim 1, comprising halting one or more data transmissions to the first computing device in response to determining that the second set of data packets does not match the network hop model.

5. The method of claim 1, comprising throttling a data transmission rate of the third set of data packets being transmitted to the first computing device in response to determining that the second set of data packets does not match the network hop model.

6. A non-transitory computer-readable medium comprising computer-executable instructions that, when executed by at least one processor, are configured to cause the at least one processor to perform operations comprising:

receiving a first set of data packets from a first computing device associated with a user over a first period of time;

generating a network hop model indicative of one or more network hops traversed by the first set of data packets;

receiving a second set of data packets from the first computing device over a second period of time;

determining whether the second set of data packets corresponds to the network hop model;

adjusting one or more operations associated with transmitting a third set of data packets to the first computing device in response to determining that the second set of data packets does not match the network hop model, wherein the one or more operations comprises:

generating an Internet Protocol (IP) tunnel configured to transmit the third set of data packet;

sending the third set of data packets to the first computing device via the IP tunnel;

generating a plurality of random pseudo bank data packets;

sending the plurality of random pseudo bank data packets via one or more additional IP tunnels; and sending a push notification to a second computing device associated with the user to authenticate the user in response to determining that the second set of data packets does not match the network hop model.

7. The non-transitory computer-readable medium of claim 6, wherein the computer-executable instructions are further configured to cause the at least one processor to perform the operations comprising sending a notification to a second computing device associated with the user to authenticate the user in response to determining that the second set of data packets does not match the network hop model.

8. The non-transitory computer-readable medium of claim 7, wherein the computer-executable instructions are further configured to cause the at least one processor to perform the operations comprising:

receiving location data associated with the second computing device;

determining whether the location data corresponds to an expected location of the user; and resuming the one or more operations associated with transmitting a fourth set of data packets to the first computing device in response to determining that the location data corresponds to the expected location.

9. The non-transitory computer-readable medium of claim 8, wherein the second computing device comprises a wearable device or a mobile device.

10. The non-transitory computer-readable medium of claim 8, wherein the location data is determined based on an IP address associated with the second computing device.

11. The non-transitory computer-readable medium of claim 7, wherein the computer-executable instructions are further configured to cause the at least one processor to perform the operations comprising:

receiving location data associated with the second computing device;

determining whether the location data corresponds to an expected location of the user; and halting the one or more operations associated with transmitting a fourth set of data packets to the first computing device in response to determining that the location data does not correspond to the expected location.

12. The non-transitory computer-readable medium of claim 6, wherein the computer-executable instructions configured to cause the at least one processor to adjust one or more operations comprises transmitting the third set of data packets using layered encryptions, random network paths, or both.

13. A system, comprising:
a first computing device;
a second computing device; and
a server system configured to:
receive a first set of data packets from the first computing device associated with a user over a first period of time;
generating an Internet Protocol (IP) tunnel configured to transmit the first set of data packets;
receive a second set of data packets from the first computing device over a second period of time;
determine whether the second set of data packets corresponds to a network hop model;
adjust one or more operations associated with transmitting a third set of data packets to the first computing device in response to determining that the second set of data packets does not match the network hop model, wherein the one or more operations comprise:
generating an Internet Protocol (IP) tunnel configured to transmit the third set of data packet;
sending the third set of data packets to the first computing device via the IP tunnel;
generating a plurality of random pseudo bank data packets;
sending the plurality of random pseudo bank data packets via one or more additional IP tunnels; and
sending a notification to a second computing device associated with the user to authenticate the user in response to determining that the second set of data packets does not match the network hop model.

14. The system of claim 13, wherein the network hop model is generated based on network traffic data associated with the first computing device.

15. The system of claim 14, wherein the network hop model is generated by applying one or more machine learning algorithms to monitor the network traffic data and identifying one or more patterns in the network traffic data.

16. The system of claim 13, wherein the one or more operations are adjusted by:

routing a first portion of the third set of data to the first computing device using a first route; and routing a second portion of the third set of data to the first computing device using a second route.

17. The system of claim 13, wherein the one or more operations are adjusted by:

encrypting a first portion of the third set of data to the first computing device using a first encryption scheme; and encrypting a second portion of the third set of data to the first computing device using a second encryption scheme.

18. The system of claim 13, wherein the plurality of random pseudo bank data packets are used to detect a fraudulent activity associated with the first computing device.

* * * * *